(12) United States Patent
Wang et al.

(10) Patent No.: US 12,014,454 B2
(45) Date of Patent: Jun. 18, 2024

(54) METHOD, ELECTRONIC DEVICE, AND COMPUTER PROGRAM PRODUCT FOR GENERATING AVATAR

(71) Applicant: Dell Products L.P., Round Rock, TX (US)

(72) Inventors: Zijia Wang, WeiFang (CN); Danqing Sha, Shanghai (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 236 days.

(21) Appl. No.: 17/687,874

(22) Filed: Mar. 7, 2022

(65) Prior Publication Data

US 2023/0237723 A1 Jul. 27, 2023

(30) Foreign Application Priority Data

Jan. 21, 2022 (CN) .......................... 202210074337.1

(51) Int. Cl.
*G06T 13/40* (2011.01)
*G06V 10/774* (2022.01)
*G06V 40/16* (2022.01)

(52) U.S. Cl.
CPC .......... *G06T 13/40* (2013.01); *G06V 10/7747* (2022.01); *G06V 40/174* (2022.01)

(58) Field of Classification Search
None
See application file for complete search history.

(56) References Cited

U.S. PATENT DOCUMENTS

| 7,027,054 | B1 * | 4/2006 | Cheiky | H04N 5/262 345/473 |
| 11,055,514 | B1 * | 7/2021 | Cao | G06V 40/161 |

(Continued)

FOREIGN PATENT DOCUMENTS

WO WO-2020046831 A1 * 5/2020 ......... G06K 9/00302

OTHER PUBLICATIONS

"Yoon et al., Speech Gesture Generation from the Trimodal Context of Text, Audio and Speaker Identity" (Year: 2020).*

(Continued)

*Primary Examiner* — Hilina K Demeter
(74) *Attorney, Agent, or Firm* — Ryan, Mason & Lewis, LLP

(57) ABSTRACT

Embodiments of the present disclosure relate to a method, an electronic device, and a computer program product for generating an avatar. The method includes generating an indication of correlation among image information, audio information, and text information of a video. The method may further include generating, based on the indication of the correlation, a first feature set and a second feature set representing features of a target object in the video, wherein the first feature set represents invariant features of the target object in the video, and the second feature set represents equivariant features of the target object in the video. The method may further include generating the avatar based on the first feature set and the second feature set. With this method, the generated avatar can be made more accurate and vivid with a better effect, while also reducing data annotation cost, improving operation efficiency, and enhancing user experience.

19 Claims, 9 Drawing Sheets

(56) References Cited

U.S. PATENT DOCUMENTS

| 11,580,400 | B1* | 2/2023 | Yan | G06N 3/04 |
|---|---|---|---|---|
| 2014/0149436 | A1* | 5/2014 | Bahrami | G06F 7/36 |
| | | | | 707/754 |
| 2018/0005037 | A1* | 1/2018 | Smith, IV | G06V 20/64 |
| 2020/0135226 | A1* | 4/2020 | Mittal | G06T 7/11 |
| 2021/0390748 | A1* | 12/2021 | Liao | G06N 3/08 |

OTHER PUBLICATIONS

Wang et al., "A Tensor-Based Multiattributes Visual Feature Recognition Method for Industrial Intelligence" (Year: 2020).*

J. Liu et al., "OPT: Omni-Perception Pre-Trainer for Cross-Modal Understanding and Generation," arXiv:2107.00249v2, Jul. 6, 2021, 10 pages.

G. Gafni et al., "Dynamic Neural Radiance Fields for Monocular 4D Facial Avatar Reconstruction," arXiv:2012.03065v1, Dec. 5, 2020, 11 pages.

U.S. Appl. No. 17/588,515 filed in the name of Zijia Wang et al. on Jan. 31, 2022, and entitled "Method, Electronic Device, and Computer Program Product for Training Model."

U.S. Appl. No. 17/588,515 filed in the name of Zijia Wang et al. on Feb. 25, 2022, and entitled "Method, Electronic Device, and Computer Program Product for Processing Data."

* cited by examiner

METHOD, ELECTRONIC DEVICE, AND COMPUTER PROGRAM PRODUCT FOR GENERATING AVATAR

RELATED APPLICATION(S)

The present application claims priority to Chinese Patent Application No. 202210074337.1, filed Jan. 21, 2022, and entitled "Method, Electronic Device, and Computer Program Product for Generating Avatar," which is incorporated by reference herein in its entirety.

FIELD

Embodiments of the present disclosure relate to video processing and, more particularly, to a method, an electronic device, and a computer program product for generating an avatar based on a video.

BACKGROUND

With the continuous development of computer vision technology, three-dimensional (3D) face reconstruction is becoming more and more widely used. For example, avatars may be generated based on 3D face reconstruction, which may be applied in application scenarios such as teleconferencing and entertainment to enhance user experience. Currently, 3D face reconstruction is usually implemented using point cloud technology. However, point cloud technology relies on a large amount of annotated data, which reduces the efficiency of face reconstruction and increases the processing cost. In addition, existing techniques cannot obtain a very accurate representation of invariant features of a face in the process of generating an avatar, and lack the utilization of the correlation in the input information. Therefore, the generated avatar is not satisfactory.

SUMMARY

According to a first aspect of the present disclosure, a method for generating an avatar is provided. The method includes: generating an indication of correlation among image information, audio information, and text information of a video; generating, based on the indication of the correlation, a first feature set and a second feature set representing features of a target object in the video, wherein the first feature set represents invariant features of the target object in the video, and the second feature set represents equivariant features of the target object in the video; and generating the avatar based on the first feature set and the second feature set.

According to a second aspect of the present disclosure, a training method for an avatar generation model is provided. The training method includes: receiving a sample image, a sample audio, and a sample text, wherein the sample image comprises a target object; generating an indication of correlation among the sample image, the sample audio, and the sample text; generating, based on the indication of the correlation, a first training feature set and a second training feature set for representing features of the target object; and training the avatar generation model based on the first training feature set and the second training feature set.

According to a third aspect of the present disclosure, an apparatus for generating an avatar is provided. The apparatus includes a correlation indication generation unit, a feature set generation unit, and an avatar generation unit. The correlation indication generation unit is configured to generate an indication of correlation among image information, audio information, and text information of a video. The feature set generation unit is configured to generate, based on the indication of the correlation, a first feature set and a second feature set representing features of a target object in the video, wherein the first feature set represents invariant features of the target object in the video, and the second feature set represents equivariant features of the target object in the video. Further, the avatar generation unit is configured to generate the avatar based on the first feature set and the second feature set.

According to a fourth aspect of the present disclosure, a training apparatus for training an avatar generation model is provided. The training apparatus includes a receiving unit, a training correlation indication generation unit, a training feature set generation unit, and a training unit. The receiving unit is configured to receive a sample image, a sample audio, and a sample text, wherein the sample image comprises a target object; and the training correlation indication generation unit is configured to generate an indication of correlation among the sample image, the sample audio, and the sample text. The training feature set generation unit is configured to generate, based on the indication of the correlation, a first training feature set and a second training feature set for representing features of the target object. Further, the training unit is configured to train the avatar generation model based on the first training feature set and the second training feature set.

According to a fifth aspect of the present disclosure, an electronic device is provided. The electronic device includes at least one processing unit and at least one memory. The at least one memory is coupled to the at least one processing unit and stores instructions for execution by the at least one processing unit, wherein the instructions, when executed by the at least one processing unit, cause the electronic device to perform the method according to the first aspect of the present disclosure.

According to a sixth aspect of the present disclosure, an electronic device is provided. The electronic device includes at least one processing unit and at least one memory. The at least one memory is coupled to the at least one processing unit and stores instructions for execution by the at least one processing unit, wherein the instructions, when executed by the at least one processing unit, cause the electronic device to perform the method according to the second aspect of the present disclosure.

According to a seventh aspect of the present disclosure, a computer-readable storage medium is provided that includes machine-executable instructions, wherein the machine-executable instructions, when executed by a device, cause the device to perform the method according to the first aspect of the present disclosure.

According to an eighth aspect of the present disclosure, a computer-readable storage medium is provided that includes machine-executable instructions, wherein the machine-executable instructions, when executed by a device, cause the device to perform the method according to the second aspect of the present disclosure.

According to a ninth aspect of the present disclosure, a computer program product is provided that is tangibly stored on a computer-readable medium and includes machine-executable instructions, wherein the machine-executable instructions, when executed by a device, cause the device to perform the method according to the first aspect.

According to a tenth aspect of the present disclosure, a computer program product is provided that is tangibly stored on a computer-readable medium and includes machine-executable instructions, wherein the machine-executable instructions, when executed by a device, cause the device to perform the method according to the second aspect.

BRIEF DESCRIPTION OF THE DRAWINGS

The above and other objectives, features, and advantages of the present disclosure will become more apparent by the description provided herein with reference to the accompanying drawings, where identical reference numerals generally represent identical components in the example embodiments of the present disclosure.

DETAILED DESCRIPTION

The following will describe embodiments of the present disclosure in more detail with reference to the accompanying drawings. Although the drawings show certain embodiments of the present disclosure, it should be understood that the present disclosure can be implemented in various forms and should not be limited to the embodiments described herein. Instead, these embodiments are provided to enable a more thorough and complete understanding of the present disclosure. It should be understood that the accompanying drawings and embodiments of the present disclosure are for exemplary purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or the same objects. Other explicit and implicit definitions may also be included below.

With the development of communication network technology and computer vision technology, 3D face reconstruction is increasingly used in people's work and life. For example, avatars may be generated based on 3D face reconstruction, which may be applied in application scenarios such as teleconferencing and entertainment to enhance user experience. Currently, 3D face reconstruction is usually implemented using point cloud technology. However, point cloud technology relies on a large amount of annotated data, which reduces the efficiency of face reconstruction and increases the processing cost. In addition, existing techniques cannot obtain a very accurate representation of invariant features of a face in the process of generating an avatar, and lack the utilization of the correlation of the input information, so that the generated avatar is not always satisfactory.

At least to address the above and other potential problems, embodiments of the present disclosure provide a method for generating an avatar. In this method, a computing device may generate an indication of correlation among image information, audio information, and text information of a video. The computing device may further generate, based on the indication of the correlation, a first feature set and a second feature set representing features of a target object in the video, wherein the first feature set represents invariant features of the target object in the video, and the second feature set represents equivariant features of the target object in the video. The computing device may generate the avatar based on the first feature set and the second feature set.

Figure 1:
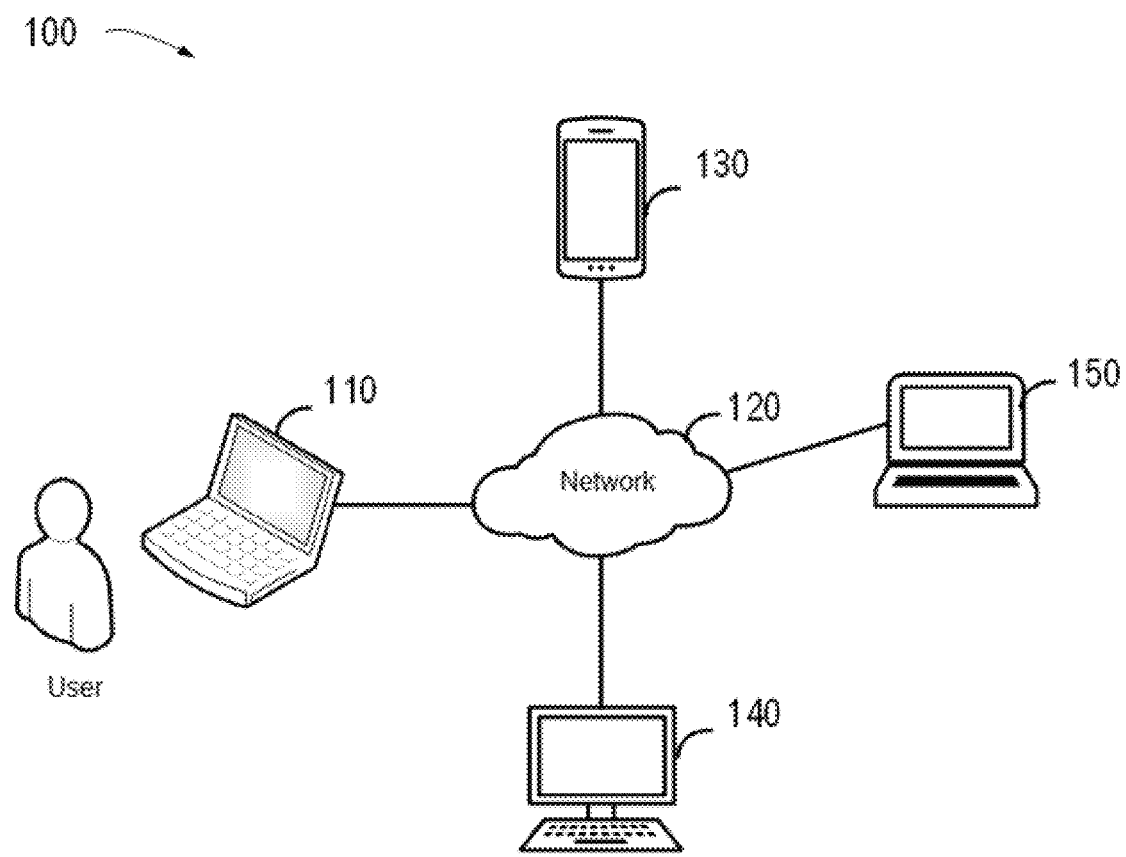
FIG. 1 illustrates a block diagram of an application scenario according to some embodiments of the present disclosure.

Embodiments of the present disclosure will be further described in detail below in conjunction with the accompanying drawings. FIG. 1 illustrates a diagram 100 of an application scenario of an avatar generation technique according to some embodiments of the present disclosure. As shown in FIG. 1, a user interacts with local electronic device 110, and electronic device 110 may use various methods for generating an avatar provided according to embodiments of the present disclosure to process real-time video images captured by an image capture apparatus (integrated in electronic device 110 or set up separately from electronic device 110, which is not limited in the present disclosure) or received image information uploaded by the user, so as to generate a corresponding avatar for the user. This user is also referred to herein as a local user, and other users in this embodiment include remote users.

The generated avatar may be sent, via network 120, to a remote terminal device such as smart terminal 130, portable computer 150, and desktop computer 140, so as to interact with the remote user of the remote terminal device, thereby enhancing the experience of both the local user and the remote user. Taking a scenario of teleconferencing as an example, the local user generates an avatar locally via electronic device 110 and sends it to corresponding participants at remote terminals 130, 140, and 150. Similarly, terminals of other participants may also perform similar avatar generation methods and send corresponding avatars to other conference participants via network 120, so that the interaction experience and participation experience of the participants can be enhanced. In other application scenarios, the local user may further process the avatar generated by electronic device 110, for example, generating a video including the avatar and sending the generated video via network 120 to a remote user at, for example, remote smart terminal 130 for viewing, thereby enabling information sharing and further enhancing the user experience.

Although electronic device 110 is shown as a portable computer in FIG. 1, it should be understood that electronic device 110 may be an electronic device in any other form. Further, FIG. 1 may include any number and any type of electronic devices and any form of communication network, which is not limited in the present disclosure. Although the above description is illustrated with teleconferencing and video sharing as an example, it should be understood that the avatar generated according to the present disclosure can be applied to any other suitable application scenario, which is not limited in the present disclosure.

Figure 2:
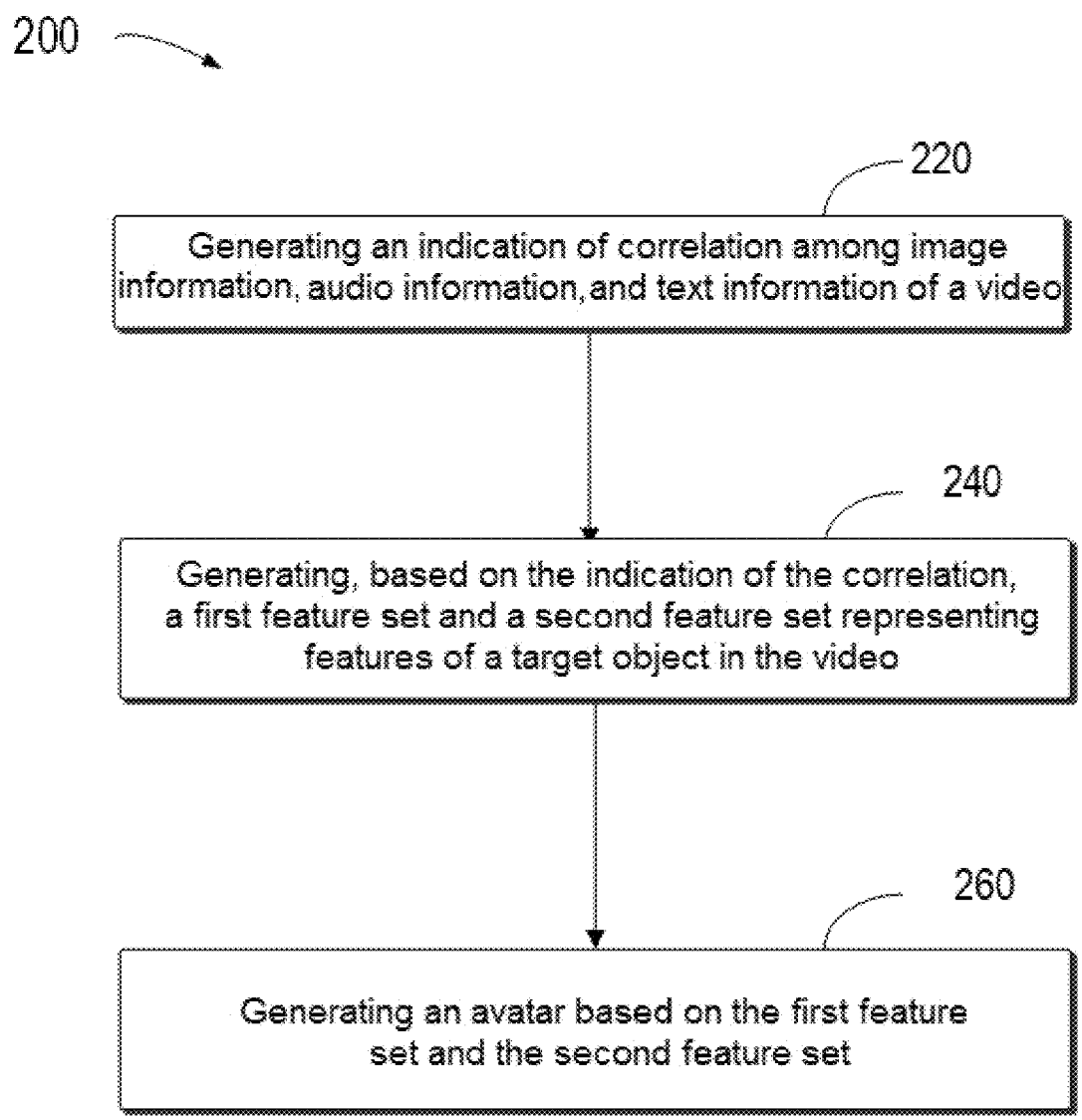
FIG. 2 illustrates an example flow chart of a method for generating an avatar according to some embodiments of the present disclosure.

FIG. 2 illustrates a method 200 for generating an avatar according to embodiments of the present disclosure. The method may be executed locally by electronic device 110 such as the one shown in FIG. 1, or remotely by a device such as a server while ensuring the security of user data privacy, and the generated avatar may be sent back to the local electronic device, which is not limited in the present disclosure. The method for generating an avatar will be described below by taking electronic device 110 as an example.

At block 220, electronic device 110 generates an indication of correlation among image information, audio information, and text information of a video.

In some implementations, electronic device 110 may receive video image information (such as a live video image of a target user), audio information (such as one or more audio segments), and text information (such as one or more literal segments). In some implementations, the audio information may include an audio segment corresponding to the received video; and accordingly, the text information may include literal information obtained after audio recognition of the audio segment. In other words, the image information, the audio information, and the text information are temporally consistent in the video. For example, the electronic device may process N video frames, and accordingly, the audio information includes corresponding audio segment A1 for these N video frames, and the text information is the corresponding text information T1 obtained after audio recognition (which may be performed using audio recognition techniques known in the field or to be developed in the future) of audio segment A1. In addition, in order to acquire more information in the video so as to increase the accuracy of the generation of the avatar, the text information may also include literal information obtained after literal recognition of literal words appearing in the video, and the recognized literal information is made to be associated with the corresponding video frames in the temporal sequence.

Figure 3:
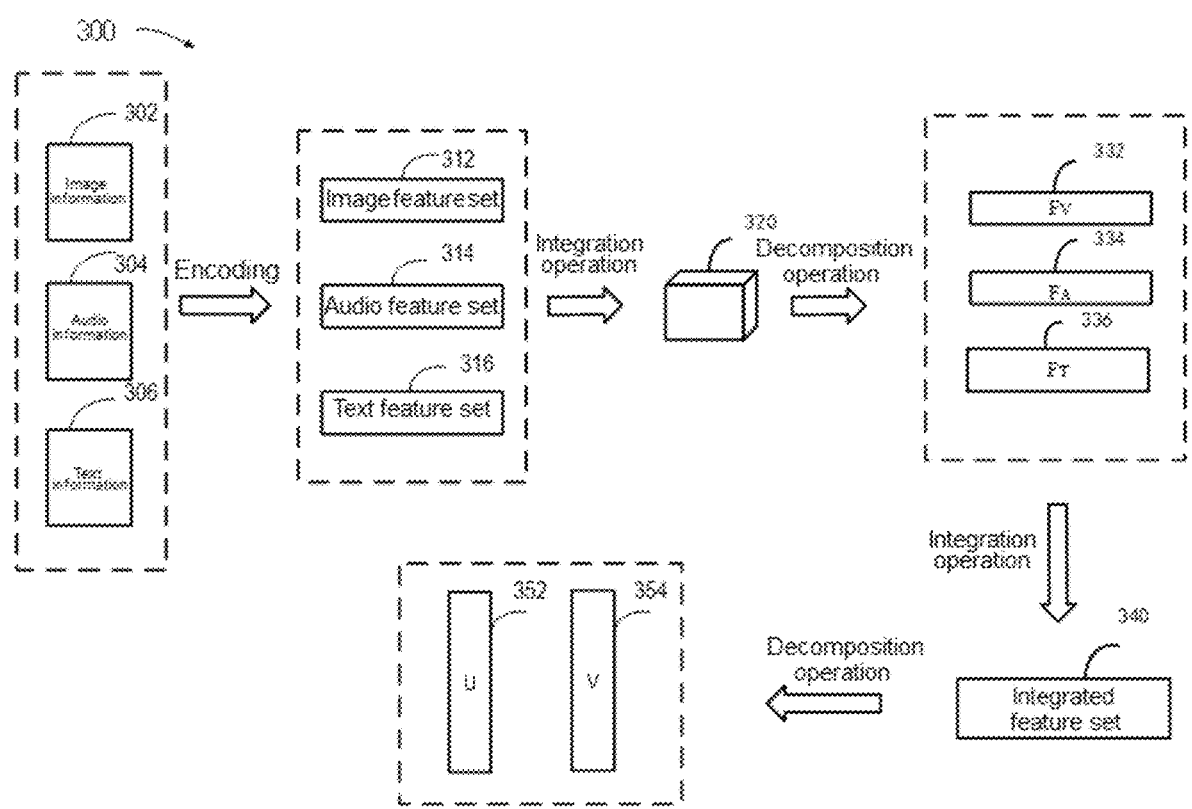
FIG. 3 illustrates a schematic diagram of feature processing according to some embodiments of the present disclosure.

Electronic device 110 may generate, based on the received image information, audio information, and text information, the indication of the correlation among the image information, the audio information, and the text information of the video. This will be further explained with reference to FIG. 3 of the accompanying drawings. FIG. 3 illustrates schematic diagram 300 of feature processing according to some embodiments of the present disclosure.

As shown in FIG. 3, electronic device 110 receives image information 302, audio information 304, and text information 306, and encodes image information 302 (e.g., video image information), audio information 304, and text information 306, respectively, to generate corresponding image feature set 312, corresponding audio feature set 314, and corresponding text feature set 316. In some embodiments, the corresponding feature sets may include a matrix form. Electronic device 110 may encode the information using techniques known in the art or to be developed in the future, which is not limited in the present disclosure. Electronic device 110 generates, based on the correlation among image feature set 312, audio feature set 314, and text feature set 316 obtained after encoding, indication 320 for representing the correlation among image feature set 312, audio feature set 314, and text feature set 316.

In some embodiments, electronic device 110 may perform correlation comparison on elements in each of image feature set 312, audio feature set 314, and text feature set 316 at a corresponding index and, according to the correlation obtained from the comparison, generate the value of indication 320 of correlation at the corresponding index. For example, if an image feature element at a corresponding index indicates that the image includes "cat," the corresponding audio feature element also indicates "cat," and the corresponding literal feature element also indicates "cat," then it may be determined that the elements in each feature set at the corresponding index are associated with one another, such that the value of indication 320 of the correlation at the corresponding index is generated according to the correspondence (e.g., a predefined relationship) between the correlation and the value in indication 320.

In some embodiments, the correspondence between the correlation and the to-be-generated value in the indication may be predefined. For example, if elements in each of image feature set 312, audio feature set 314, and text feature set 316 at the corresponding index are all associated with one another, the corresponding value may be defined as 1. If elements in each of image feature set 312, audio feature set 314, and text feature set 316 at the corresponding index are all unassociated with one another, the corresponding value may be defined as 0.

After determining the correlation of all feature elements in each of image feature set 312, audio feature set 314, and text feature set 316, indication 320 of the correlation is obtained, where this indication 320 of the correlation indicates the correlation among feature elements in each of image feature set 312, audio feature set 314, and text feature set 316 at the corresponding index. The determination of the correlation among elements in each feature set at the corresponding index may be performed using known related techniques and techniques to be developed in the future, which is not limited in the present disclosure. In one implementation, the indication of the correlation may include a synthetic tensor form, as shown in FIG. 3.

Returning to FIG. 2, at block 240, the electronic device 110 generates, based on indication 320 of the correlation, a first feature set and a second feature set representing features of a target object in the video, wherein the first feature set represents invariant features of the target object in the video, and the second feature set represents equivariant features of the target object in the video.

This will continue to be further explained below in connection with FIG. 3. Specifically, as illustrated in FIG. 3, the explanation will be provided taking the case where indication 320 of the correlation includes a tensor, and more particularly a synthetic tensor, as an example. After the synthetic tensor is generated, electronic device 110 may perform a decomposition operation on the synthetic tensor. For example, electronic device 110 may perform a CANDECOMP/PARAFAC (CP) decomposition operation on the synthetic tensor to obtain three features: a decomposed image feature set $F_V$ 332, a decomposed audio feature set $F_A$ 334, and a decomposed text feature set $F_T$ 336. It should be understood that any other suitable decomposition technique may also be used to decompose the tensor to obtain the decomposed image feature set $F_V$ 332, the decomposed audio feature set $F_A$ 334, and the decomposed text feature set $F_T$ 336, which is not limited in the present disclosure.

By the above decomposition operation, the decomposed image feature set $F_V$ 332, the decomposed audio feature set $F_A$ 334, and the decomposed text feature set $F_T$ 336 may be obtained, so that the feature information is mapped from the original space to the frequency space. At the same time, the multi-dimensional tensor is decomposed into multiple low-dimensional feature sets, thereby reducing the computational effort and improving the operational efficiency. In addition, the decomposed feature sets obtained above are feature sets for which noise removal has been performed, and accordingly, the accuracy and effect of the subsequent processing can be improved.

After the decomposed image feature set $F_V$ 332, the decomposed audio feature set $F_A$ 334, and the decomposed text feature set $F_T$ 336 are obtained, electronic device 110 further performs an integration operation on the above decomposed feature sets $F_V$ 332, $F_A$ 334, and $F_T$ 336, for example, by inputting these three features to a cross-modal encoder (not shown in the drawings; for example, a transformer-based neural network) to obtain the integrated feature set 340, as shown in FIG. 3.

Electronic device 110 further performs a decomposition operation on the integrated feature set 340 to obtain first feature set u 352 and second feature set v 354. In some embodiments, the decomposed image feature set $F_V$ 332, the decomposed audio feature set $F_A$ 334, and the decomposed text feature set $F_T$ 336 each include a matrix form, and after these feature sets pass through the cross-modal encoder, electronic device 110 may obtain the integrated feature set 340. In some embodiments, this integrated feature set 340 may include a matrix M, and the first feature set u 352 and second feature set v 354 may more particularly comprise respective first matrix u 352 and second matrix v 354. Electronic device 110 may perform a decomposition operation on matrix M to obtain the first matrix u 352 and the second matrix v 354, e.g., M=uv, where $u \in \mathcal{R}^{N \times k}$ denotes an invariant matrix, and $v \in \mathcal{R}^{k \times d}$ denotes an equivariant matrix. In some embodiments of the present disclosure, u 352 may denote invariant features of the target object in the video, for example, invariant features of the target object such as the face shape, the face frame, and the positions of the five sense organs; and v 354 may denote equivariant features of the target object in the video, for example, equivariant features such as lips and eyes.

In some embodiments, electronic device 110 may perform a singular value decomposition operation on the integrated matrix M to obtain the above-mentioned first matrix u 352 and second matrix v 354. With respect to the singular value decomposition, it can be understood that any other suitable decomposition operation already known or to be developed in the future may also be used to obtain the above-mentioned first matrix and second matrix, and that the first matrix may denote the invariant features of the target object, and the second matrix may denote the equivariant features of the target object.

In some embodiments, the above method may be performed utilizing a trained model in electronic device 110. For example, the model may be trained by a training device so as to predict the generation of the first matrix and the second matrix.

In some implementations, the training device may acquire a training feature set (e.g., training matrix M1) and a corresponding transformed training feature set (e.g., training matrix M2), where the corresponding transformed training feature set is obtained by transforming the training features in the training feature set. For example, a linear transform is performed on each element in the training matrix M1 to obtain the transformed training matrix M2. Afterwards, the training device may decompose the training feature set to obtain a decomposed first training feature set and a decomposed second training feature set. For example, the training device may decompose the training matrix M1 to obtain decomposed training feature matrices u1 and v1.

In addition, the training device may also decompose the transformed training feature set to obtain a first transformed decomposed training feature set and a second transformed decomposed training feature set. For example, the training device decomposes the training matrix M2 to obtain decomposed training feature matrices u2 and v2.

Afterwards, the training device may obtain a first similarity loss according to the decomposed first training feature set and the first transformed decomposed training feature set. The training device may also obtain a second similarity loss according to the decomposed second training feature set and the second transformed decomposed training feature set. The training device may perform the above operations in an iterative way until the number of iterations reaches a predetermined number of times or the sum (or weighted sum) of the first similarity loss and the second similarity loss is minimized, thereby obtaining a trained model. Hereinafter, the training process for the model will be described in further detail in connection with FIG. 5 and FIG. 6.

Returning to FIG. 2, after obtaining the first feature set and the second feature set denoting the invariant features and the equivariant features of the target object, respectively, in block 260, electronic device 110 generates the avatar based on the first feature set and the second feature set.

In some implementations, electronic device 110 obtains, based on the first feature set and the second feature set described above, a facial expression parameter, an attribute parameter, and a pose parameter representing the target object. In some implementations, the facial expression parameter may characterize the facial expression of the target object such as smiling, squinting, opening mouth, etc., the attribute parameter may characterize the face shape and the positions of the five sense organs of the target object, and the pose parameter may characterize the pose of the target object such as bowing the head, turning the head, etc., which is not limited in the present disclosure. Electronic device 110 may render a to-be-rendered object based on the acquired facial expression parameter, attribute parameter, and pose parameter to generate the avatar. The to-be-rendered object may include a material selected by the target object or selected by electronic device 110, for example, an appearance such as a cartoon material. Electronic device 110 may process, for example, overlay, the acquired facial expression parameter, attribute parameter, and pose parameter with the selected material, etc., and render them to obtain the final avatar. The present disclosure does not limit the specific rendering method.

Further, in some embodiments, in addition to the image information, the audio information, and the text information, electronic device 110 may also obtain information representing the background of the video, for example, a still image including background information, so that the background information, illuminating information, etc. for the generated avatar can be adjusted according to information such as light in the background, thus allowing the generated image including the avatar to more closely resemble the video image including the target object, thereby further enhancing the user experience.

In the above method for generating an avatar, invariant features representing the target object are obtained by obtaining the correlation among the image, audio, and text, which can make the generated avatar more accurate and vivid with a better effect; and at the same time, the use of point cloud technology is avoided, the cost of data annotation is reduced, the operation efficiency is improved, and the user experience is further enhanced.

Figure 4:
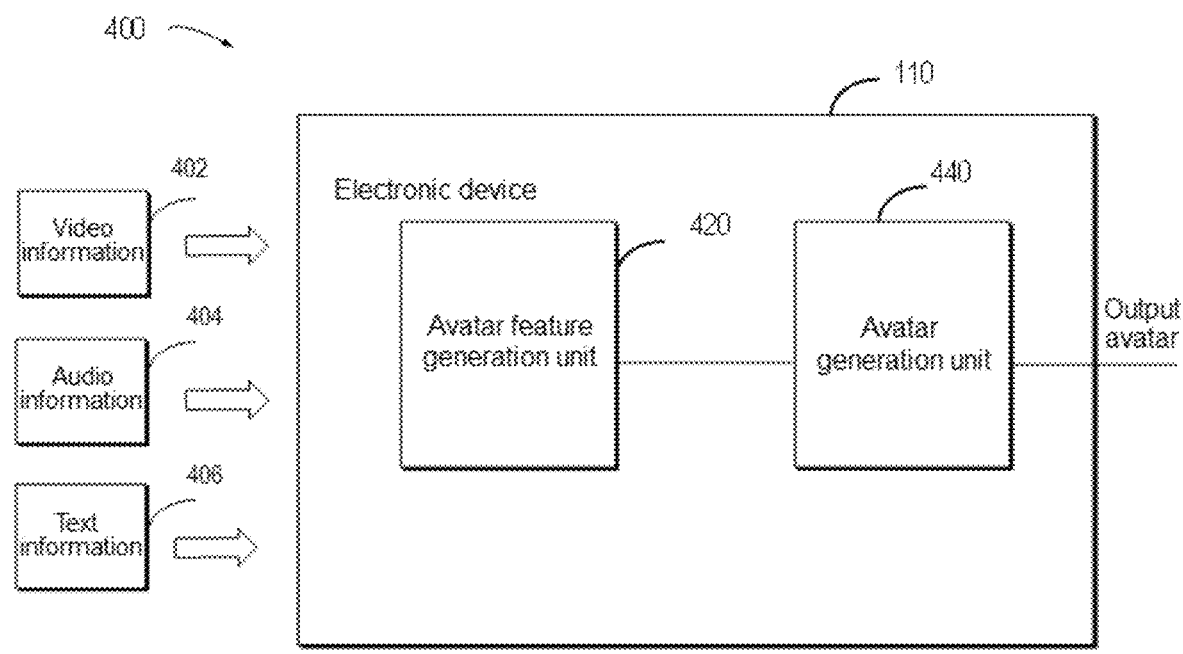
FIG. 4 illustrates an architecture diagram for the application of an avatar generation method according to some embodiments of the present disclosure.

FIG. 4 illustrates architecture diagram 400 for avatar generation according to embodiments of the present disclosure. The avatar generation method based on the present disclosure may be executed locally by electronic device 110 such as the one shown in FIG. 1, or remotely by a device such as a server while ensuring the security of user data privacy, and the generated avatar may be sent back to the local electronic device 110, which is not limited in the present disclosure. In FIG. 4, architecture diagram 400 for the generation of an avatar is described by taking electronic device 110 as an example.

Electronic device 110 receives video image information 402, audio information 404, and text information 406 and inputs the received information to avatar feature generation unit 420, and avatar feature generation unit 420, by executing avatar generation method 200 such as that illustrated in FIG. 2, obtains a first feature set representing invariant features of the target object and a second feature set representing equivariant features of the target object, and further acquires a facial expression parameter, an attribute parameter, and a pose parameter of the target object. Avatar generation unit 440 may render a to-be-rendered object based on the obtained facial expression parameter, attribute parameter, and pose parameter to obtain the output avatar, as described above.

In some implementations, the generated avatar includes a real-time avatar, i.e., the facial expression and/or pose of the generated avatar changes in real time with the facial expression and/or pose of the target object, thereby enabling better application in scenarios such as video conferencing and remote video communication that require high real-time performance, thus enhancing use convenience for users and improving user experience.

The avatar generation method according to embodiments of the present disclosure may be performed by a trained avatar generation model (e.g., avatar feature generation unit 420 in FIG. 4) in the electronic device. Accordingly, a training method for the avatar generation model will be described below.

Figure 5:
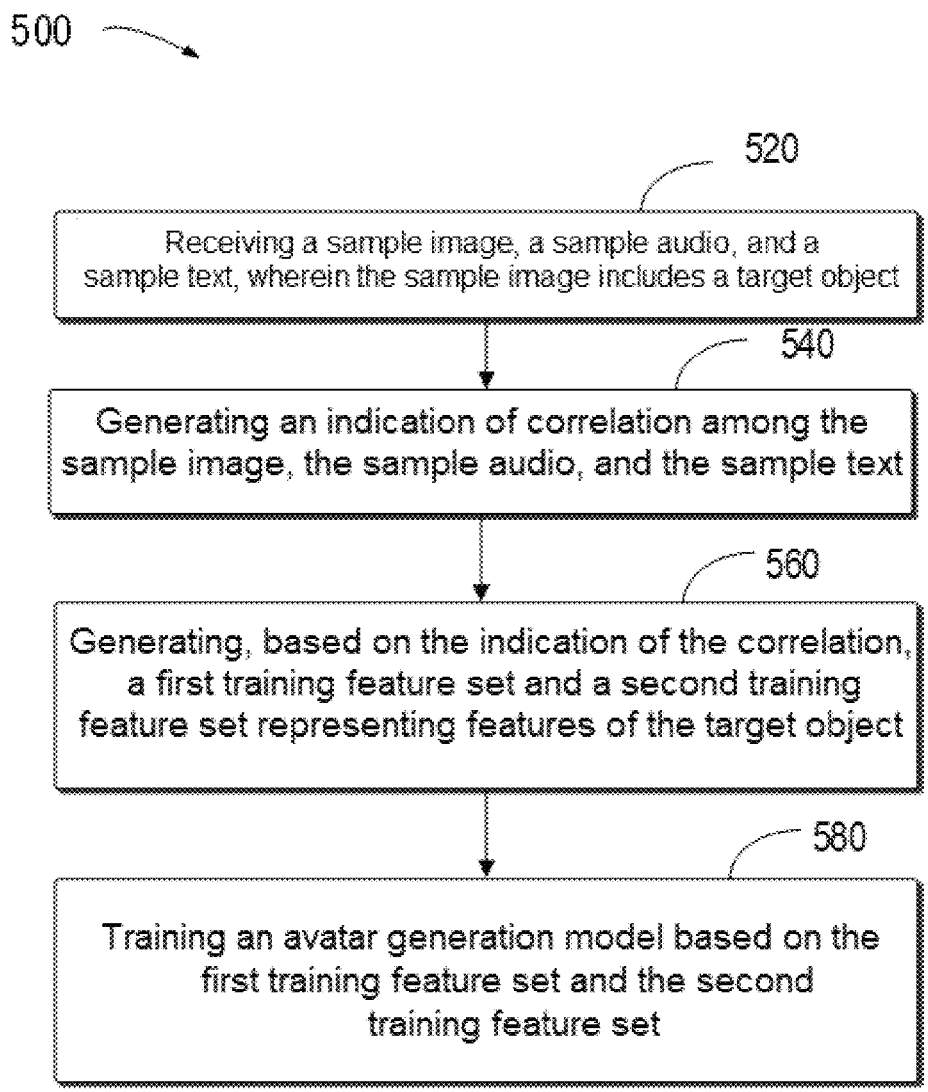
FIG. 5 illustrates an example flow chart of a training method for an avatar generation model according to some embodiments of the present disclosure.

Referring to FIG. 5, a training method 500 for training an avatar generation model according to embodiments of the present disclosure is illustrated. The method may be performed by a training device, which in some embodiments may include electronic device 110, and accordingly, electronic device 110 performs the training process locally to generate the trained avatar generation model. It should be understood that the training device may also include other electronic devices, and accordingly, the other devices perform the training process to generate the trained avatar generation model. The present disclosure does not limit the training device.

As shown in FIG. 5, at block 520, the training device receives a sample image, a sample audio, and a sample text. The sample image may include video image frames of a certain length, where the sample image includes a target object. The above sample information may be acquired from an open source information base, which is not limited in the present disclosure.

At block 540, the training device generates an indication of correlation among the sample image, the sample audio, and the sample text. For example, the training device may encode the sample image, the sample audio, and the sample text, respectively, to generate a corresponding sample image feature set, a corresponding sample audio feature set, and a corresponding sample text feature set, and further generate, based on correlation among the sample image feature set, the sample audio feature set, and the sample text feature set, the indication of the correlation. Each element in the indication of the correlation represents correlation among elements in each sample feature set of the sample image feature set, the sample audio feature set, and the sample text feature set at a corresponding index. The process of generating the indication of the correlation may be understood in conjunction with the description in block 220 in FIG. 2. For the sake of simplicity, this will not be repeated here.

At block 560, the training device generates, based on the indication of the correlation, a first training feature set and a second training feature set for representing features of the target object. In some implementations, the training device may encode the sample image, the sample audio, and the sample text to generate a corresponding sample image feature matrix, a corresponding sample audio feature matrix, and a corresponding sample text feature matrix, and further, the indication of the correlation may include a training synthetic tensor.

In some implementations, the training device may generate, based on the generated indication of the correlation, the first training feature set and the second training feature set. Hereinafter, the process of generating the first training feature set and the second feature set will be described in detail with reference to FIG. 6. It should be understood that the steps in FIG. 6 are only schematic and, although the flow chart is depicted in the order in FIG. 6, it should be understood that the order of the steps in FIG. 6 may be performed in other orders or simultaneously, which is not limited in the present disclosure.

Figure 6:
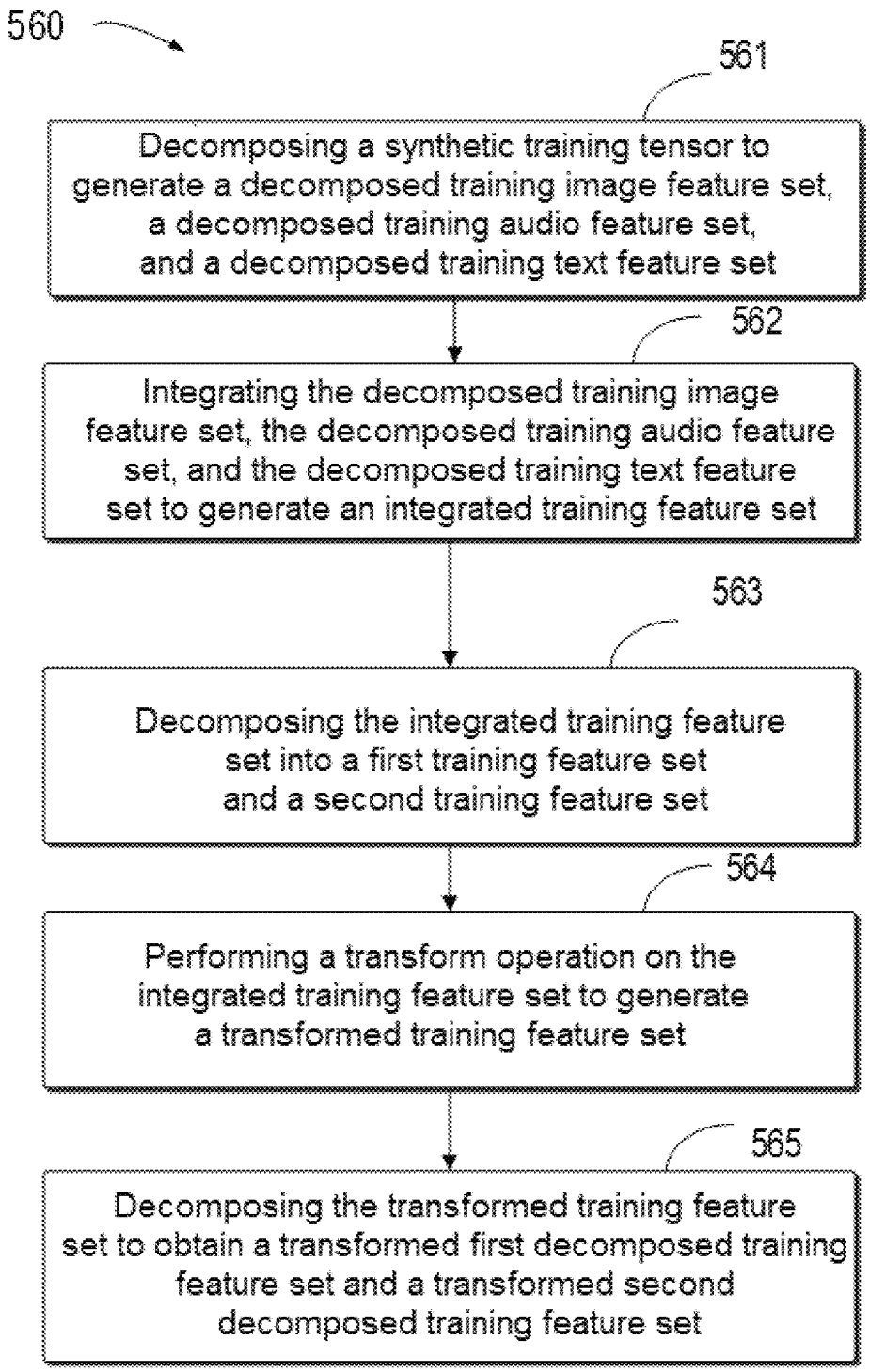
FIG. 6 illustrates a more detailed example flow chart for generating a first training feature set and a second training feature set according to some embodiments of the present disclosure.

As shown in FIG. 6, at block 561, the training device decomposes the synthetic training tensor to generate a decomposed training image feature set, a decomposed training audio feature set, and a decomposed training text feature set.

In some implementations, the training device may decompose the training tensor by using techniques such as CP decomposition, which is not limited in the present disclosure. In some embodiments, the training device may further train the process such that the sum of the similarity differences between the decomposed training image feature set, the decomposed training audio feature set, and the decomposed training text feature set and the real image feature set, the real audio feature set, and the real text feature set, respectively, is minimized, which is not limited in the present disclosure.

In block 562 in FIG. 6, the training device integrates the decomposed training image feature set, the decomposed training audio feature set, and the decomposed training text feature set to generate an integrated training feature set M1.

With continued reference to FIG. 6, in block 563, the training device decomposes the integrated training feature set M1 into a first training feature set u1 and a second training feature set v1, where the first training feature set u1 may be used to represent invariant features of the target object, and the second training feature set v1 may be used to represent equivariant features of the target object.

In block 564, the training device may perform a transform operation, e.g., a linear transform operation, on the integrated training feature set M1 to generate a transformed training feature set M2; and in block 565, the training device may decompose the transformed training feature set M2 to obtain a transformed first decomposed training feature set u2 and a transformed second decomposed training feature set v2.

Returning to FIG. 5, in block 580, the training device trains the avatar generation model based on the first training feature set and the second training feature set. For example, the training device may acquire a first similarity loss $L_v$ based on the first training feature set u1 and the transformed first decomposed training feature set u2. For example, the training device may perform the similarity loss calculation on ui to obtain a corresponding loss function: $L_v=-\text{sim}(u_1, \text{trans}(u_2))$, where trans (*) denotes a linear transform function, and sim (*) denotes a similarity between variables. In addition, the training device may also acquire a second similarity loss $L_s$ based on the second training feature set v1 and the transformed second decomposed training feature set v2, for example, the training device may perform the similarity loss calculation on vi to obtain the corresponding loss function: $L_s=-\text{sim}(v_1,v_2)$, where sim (*) denotes the similarity between variables.

In some implementations, after obtaining the similarity losses of ui and vi, the training device may calculate the sum of the similarity losses $L=L_s+L_v$ and iterate the above process such that the sum of the similarity losses $L=L_s+L_v$ is minimized, where $L_v=-\text{sim}(u_1, \text{trans}(u_2))$, and $L_s=-\text{sim}(v_1, v_2)$. In addition, the training device may also iterate the above process, and obtain the trained avatar generation model by making the number of iterations reach a preset number of times. The present disclosure does not limit the condition under which the training iterations are stopped, and a user may set the condition according to actual needs.

Figure 7:
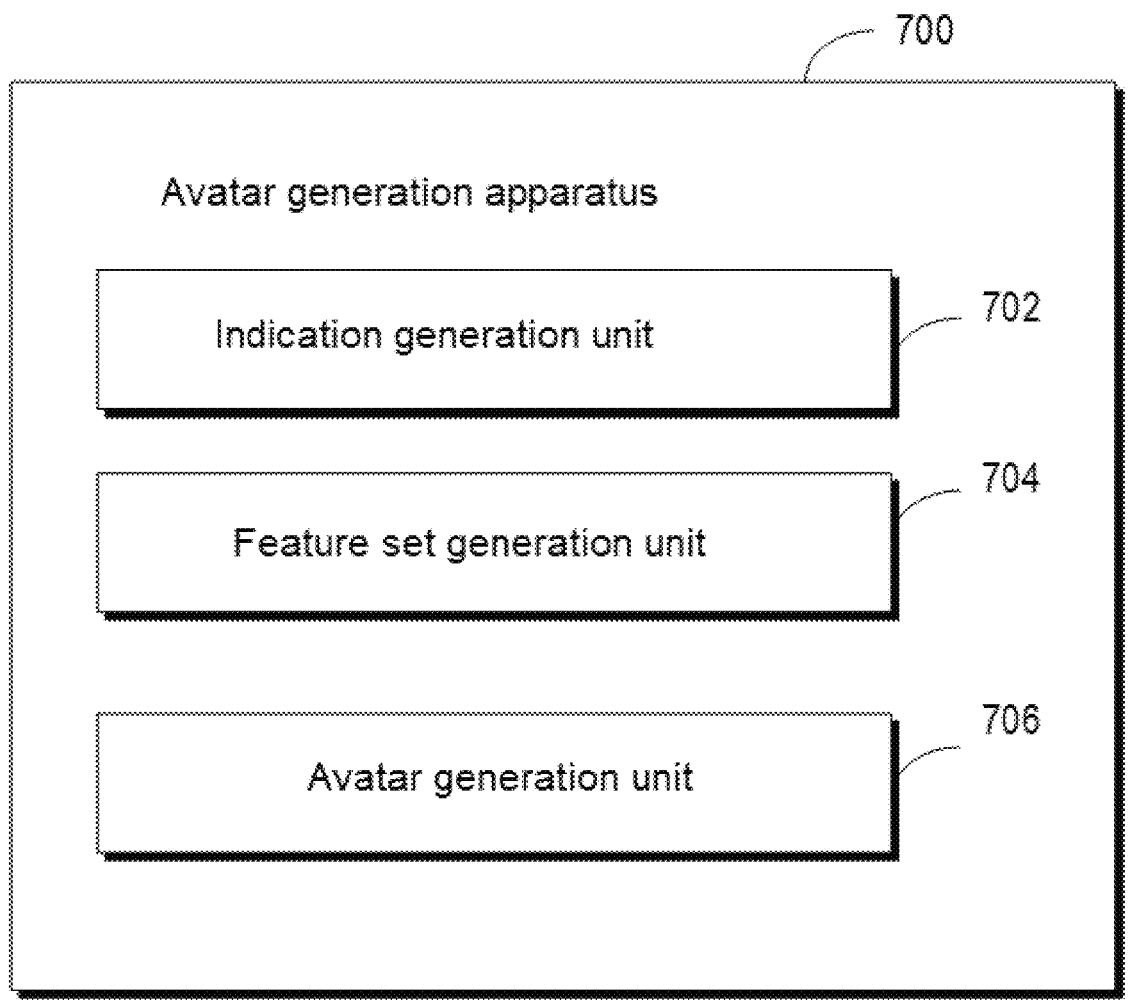
FIG. 7 illustrates a schematic block diagram of an apparatus for avatar generation according to some embodiments of the present disclosure.

The avatar generation method of the present disclosure may be performed by the electronic device 110. Referring to FIG. 7, avatar generation apparatus 700 is illustrated. The apparatus is applied to generate an avatar and may be applied within the electronic device 110. The apparatus may include indication generation unit 702, feature set generation unit 704, and avatar generation unit 706.

In some implementations, this indication generation unit 702 is configured to generate an indication of correlation among image information, audio information, and text information of a video. Feature set generation unit 704 is configured to generate, based on the indication of the correlation, a first feature set and a second feature set representing features of a target object in the video, where the first feature set represents invariant features of the target object in the video, and the second feature set represents equivariant features of the target object in the video. Further, avatar generation unit 706 is configured to generate the avatar based on the first feature set and the second feature set.

In some embodiments, indication generation unit 702 is configured to encode the image information, the audio information, and the text information, respectively, to generate a corresponding image feature set, a corresponding audio feature set, and a corresponding text feature set, and to generate, based on correlation among the image feature set, the audio feature set, and the text feature set, the indication of the correlation.

In some embodiments, each element in the indication represents correlation among elements in each of the image feature set, the audio feature set, and the text feature set at a corresponding index.

In some embodiments, the indication of the correlation includes a synthetic tensor feature set, and accordingly, feature set generation unit 704 may be configured to decompose the synthetic tensor to obtain a decomposed image feature set, a decomposed audio feature set, and a decomposed text feature set, and integrate the decomposed image feature set, the decomposed audio feature set, and the decomposed text feature set to generate an integrated feature set.

In some embodiments, feature set generation unit 704 may be configured to decompose the integrated feature set into a first feature set and a second feature set.

In some embodiments, the apparatus for generating an avatar is generated through training, and the apparatus may be trained by iteratively performing the following operations: acquiring a training feature set and a corresponding transformed training feature set, wherein the corresponding transformed training feature set is obtained after transforming training features in the training feature set; decomposing the training feature set to obtain a decomposed first training feature set and a decomposed second training feature set; decomposing the transformed training feature set to obtain a first transformed decomposed training feature set and a second transformed decomposed training feature set; obtaining a first similarity loss according to the decomposed first training feature set and the first transformed decomposed training feature set; and obtaining a second similarity loss according to the decomposed second training feature set and the second transformed decomposed training feature set. The above training operations may be performed iteratively until the sum of the first similarity loss and the second similarity loss is minimized or the number of iterations reaches a predetermined number of times, thereby obtaining a trained apparatus for use in generate an avatar.

In some embodiments, feature set generation unit 704 is further configured to acquire a facial expression parameter, an attribute parameter, and a pose parameter of the target object based on the first feature set and the second feature set, and accordingly, avatar generation unit 706 is configured to render a to-be-rendered object according to the acquired facial expression parameter, attribute parameter, and pose parameter to generate the corresponding avatar.

In some embodiments, the image information, the audio information, and the text information are temporally consistent in the video. In some embodiments, the text information is obtained after audio recognition of the audio information.

It is to be noted that avatar generation apparatus 700 shown in FIG. 7 may perform operations in the method embodiment shown in FIG. 2 and implement the processes and achieve the effect in the method embodiment shown in FIG. 2. It will be clear to those skilled in the art that, for the convenience and brevity of description, reference may be made to corresponding processes in the preceding method embodiments for specific working processes of the units described above, which will not be repeated here.

Figure 8:
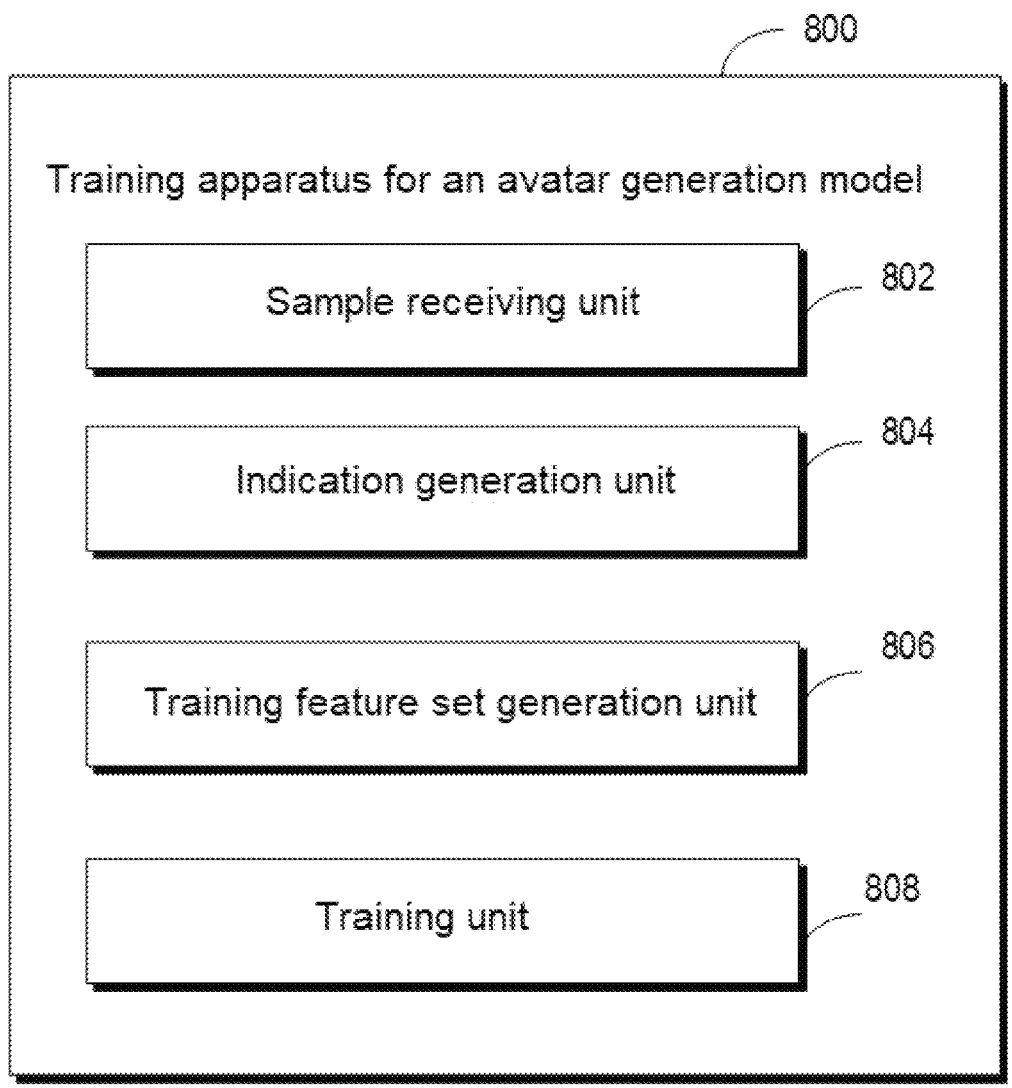
FIG. 8 illustrates a schematic block diagram of a training apparatus for training an avatar generation model according to some embodiments of the present disclosure.

In some embodiments, the present disclosure further provides training apparatus 800 for an avatar generation model. As shown in FIG. 8, the training apparatus 800 may include sample receiving unit 802, indication generation unit 804, training feature set generation unit 806, and training unit 808.

In some embodiments, sample receiving unit 802 is configured to receive a sample image, a sample audio, and a sample text, where the sample image includes a target object. Indication generation unit 804 is configured to generate an indication of correlation among the sample image, the sample audio, and the sample text. Training feature set generation unit 806 is configured to generate, based on the indication of the correlation, a first training feature set and a second training feature set for representing features of the target object. Further, training unit 808 is configured to train avatar generation model based on the first training feature set and the second training feature set.

In some embodiments, indication generation unit 804 is configured to encode the sample image, the sample audio, and the sample text, respectively, to generate a corresponding sample image feature set, a corresponding sample audio feature set, and a corresponding sample text feature set; and generate, based on correlation among the sample image feature set, the sample audio feature set, and the sample text feature set, the indication of the correlation.

In some embodiments, each element in the indication of the correlation represents correlation among elements in each sample feature set of the sample image feature set, the sample audio feature set, and the sample text feature set at a corresponding index.

In some embodiments, the indication of the correlation includes a training synthetic tensor, and accordingly, training feature set generation unit 806 is configured to decompose the synthesis training tensor to generate a decomposed training image feature set, a decomposed training audio feature set, and a decomposed training text feature set; and integrate the decomposed training image feature set, the decomposed training audio feature set, and the decomposed training text feature set to generate an integrated training feature set.

In some embodiments, training feature set generation unit 806 is configured to: decompose the integrated training feature set into a first training feature set and a second training feature set, where the first training feature set is used to represent invariant features of the target object, and the second training feature set is used to represent equivariant features of the target object.

Further, training feature set generation unit 806 is further configured to: perform a transform operation on the integrated training feature set to generate a transformed training feature set; and decompose the transformed training feature set to obtain a transformed first decomposed training feature set and a transformed second decomposed training feature set.

Accordingly, training unit 808 is configured to: acquire a first similarity loss based on the first training feature set and the transformed first decomposed training feature set; acquire a second similarity loss based on the second training feature set and the transformed second decomposed training feature set; acquire a sum of the first similarity loss and the second similarity loss; and train the avatar generation model based on the sum of the first similarity loss and the second similarity loss.

It is to be noted that training apparatus 800 shown in FIG. 8 may perform the steps in the method embodiment shown in FIG. 5 to FIG. 6 and implement the processes and achieve the effect in the method embodiment shown in FIG. 5 to FIG. 6. It will be clear to those skilled in the art that, for the convenience and brevity of description, reference may be made to corresponding processes in the preceding method embodiments for specific working processes of the units described above, which will not be repeated here.

Figure 9:
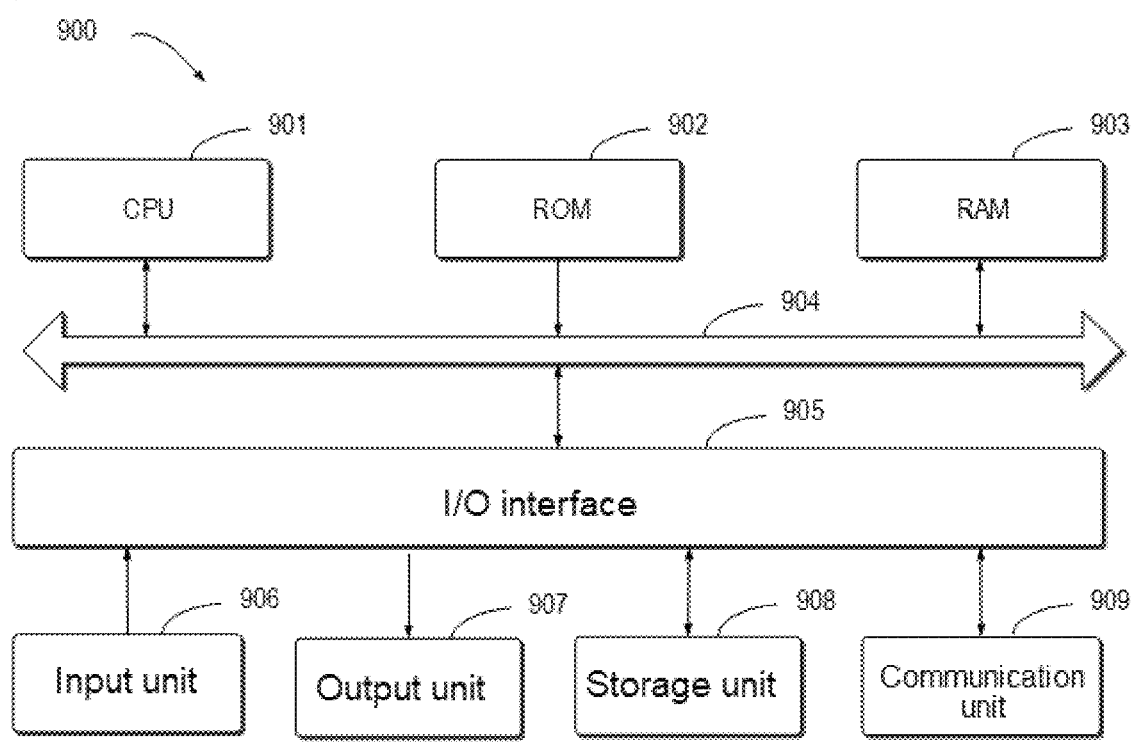
FIG. 9 illustrates a schematic block diagram of an example device that may be used to implement some embodiments of the present disclosure.

FIG. 9 illustrates a schematic block diagram of example device 900 which may be configured to implement an embodiment of the present disclosure. Electronic device 110 in FIG. 1 can be implemented using device 900. As shown in the figure, device 900 includes central processing unit (CPU) 901 that may perform various appropriate actions and processing according to computer program instructions stored in read-only memory (ROM) 902 or computer program instructions loaded from storage unit 908 to random access memory (RAM) 903. Various programs and data required for the operation of device 900 may also be stored in RAM 903. CPU 901, ROM 902, and RAM 903 are connected to each other through bus 904. Input/output (I/O) interface 905 is also connected to bus 904.

A plurality of components in device 900 are connected to I/O interface 905, including: input unit 906, such as a keyboard and a mouse; output unit 907, such as various types of displays and speakers; storage unit 908, such as a magnetic disk and an optical disc; and communication unit 909, such as a network card, a modem, and a wireless communication transceiver. Communication unit 909 allows device 900 to exchange information/data with other devices via a computer network, such as the Internet, and/or various telecommunication networks.

The various processes and processing described above, such as method 200 or 500, may be performed by CPU 901. For example, in some embodiments, method 200 or 500 may be implemented as a computer software program that is tangibly included in a machine-readable medium, such as storage unit 908. In some embodiments, part or all of the computer program may be loaded and/or installed onto device 900 via ROM 902 and/or communication unit 909. When the computer program is loaded to RAM 903 and executed by CPU 901, one or more actions of method 200 or 500 described above may be performed.

Embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Example embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrated embodiments. The selection of terms as used herein is intended to best explain the principles and practical applications of the various embodiments or technical improvements to technologies on the market, so as to enable persons of ordinary skill in the art to understand the embodiments disclosed herein.

What is claimed is:

1. A method for generating an avatar, comprising:
    generating an indication of correlation among image information, audio information, and text information of a video, the indication of the correlation comprising a tensor characterizing feature element associations between corresponding feature elements of the image information, the audio information, and the text information;
    generating, based on the indication of the correlation and at least in part through application of a decomposition process to the tensor, a first feature set and a second feature set representing features of a target object in the video, wherein the first feature set represents invariant features of the target object in the video, and the second feature set represents equivariant features of the target object in the video; and
    generating the avatar based on the first feature set and the second feature set;
    wherein generating, based on the indication of the correlation, a first feature set and a second feature set representing features of a target object in the video comprises:
    decomposing the tensor to obtain a decomposed image feature set, a decomposed audio feature set, and a decomposed text feature set; and
    integrating the decomposed image feature set, the decomposed audio feature set, and the decomposed text feature set to generate an integrated feature set; and wherein generating, based on the indication, a first feature set and a second feature set representing features of a target object in the video further comprises:
  decomposing the integrated feature set into the first feature set and the second feature set.

2. The method according to claim 1, wherein generating an indication of correlation among image information, audio information, and text information of a video comprises:
  encoding the image information, the audio information, and the text information, respectively, to generate a corresponding image feature set, a corresponding audio feature set, and a corresponding text feature set; and
  generating, based on correlation among the image feature set, the audio feature set, and the text feature set, the indication of the correlation.

3. The method according to claim 2, wherein each element in the indication of the correlation represents correlation among elements in each of the image feature set, the audio feature set, and the text feature set at a corresponding index.

4. The method according to claim 1, wherein the indication of the correlation comprises a synthetic tensor.

5. The method according to claim 1, further comprising:
  acquiring, based on the first feature set and the second feature set, a facial expression parameter, an attribute parameter, and a pose parameter of the target object; and
  rendering a to-be-rendered object according to the acquired facial expression parameter, attribute parameter, and pose parameter to generate the avatar.

6. The method according to claim 1, further comprising:
  performing audio recognition on the audio information to obtain the text information.

7. The method according to claim 1, wherein the image information, the audio information, and the text information are temporally consistent in the video.

8. The method according to claim 1, further comprising:
  training an avatar generation model, wherein training an avatar generation model comprises:
  receiving a sample image, a sample audio, and a sample text, wherein the sample image comprises a target object;
  generating an indication of correlation among the sample image, the sample audio, and the sample text;
  generating, based on the indication of the correlation, a first training feature set and a second training feature set for representing features of the target object; and
  training the avatar generation model based on the first training feature set and the second training feature set.

9. The method according to claim 8, wherein generating an indication of correlation among the sample image, the sample audio, and the sample text comprises:
  encoding the sample image, the sample audio, and the sample text, respectively, to generate a corresponding sample image feature set, a corresponding sample audio feature set, and a corresponding sample text feature set; and
  generating, based on correlation among the sample image feature set, the sample audio feature set, and the sample text feature set, the indication of the correlation.

10. The method according to claim 9, wherein each element in the indication of the correlation represents correlation among elements in each sample feature set of the sample image feature set, the sample audio feature set, and the sample text feature set at a corresponding index.

11. The method according to claim 8, wherein the indication of the correlation comprises a training synthetic tensor, and wherein generating, based on the indication of the correlation, a first training feature set and a second training feature set representing features of the target object comprises:
  decomposing the training synthetic tensor to generate a decomposed training image feature set, a decomposed training audio feature set, and a decomposed training text feature set; and
  integrating the decomposed training image feature set, the decomposed training audio feature set, and the decomposed training text feature set to generate an integrated training feature set.

12. The method according to claim 11, wherein generating, based on the indication of the correlation, a first training feature set and a second training feature set representing features of the target object further comprises:
  decomposing the integrated training feature set into the first training feature set and the second training feature set,
  wherein the first training feature set is used to represent invariant features of the target object and the second training feature set is used to represent equivariant features of the target object.

13. The method according to claim 12, wherein training the avatar generation model based on the first training feature set and the second training feature set comprises:
  performing a transform operation on the integrated training feature set to generate a transformed training feature set; and
  decomposing the transformed training feature set to obtain a transformed first decomposed training feature set and a transformed second decomposed training feature set.

14. The method according to claim 13, wherein training the avatar generation model based on the first training feature set and the second training feature set further comprises:
  acquiring a first similarity loss based on the first training feature set and the transformed first decomposed training feature set;
  acquiring a second similarity loss based on the second training feature set and the transformed second decomposed training feature set; and
  acquiring a sum of the first similarity loss and the second similarity loss.

15. The method according to claim 14, further comprising:
  training the avatar generation model based on the sum of the first similarity loss and the second similarity loss.

16. A method for generating an avatar, comprising:
  generating an indication of correlation among image information, audio information, and text information of a video;
  generating, based on the indication of the correlation, a first feature set and a second feature set representing features of a target object in the video, wherein the first feature set represents invariant features of the target object in the video, and the second feature set represents equivariant features of the target object in the video; and
  generating the avatar based on the first feature set and the second feature set;
  wherein the method is performed utilizing a trained model, wherein the model is trained by iteratively performing the following actions:
  acquiring a training feature set and a corresponding transformed training feature set, wherein the corresponding transformed training feature set is obtained after transforming training features in the training feature set;

decomposing the training feature set to obtain a decomposed first training feature set and a decomposed second training feature set;

decomposing the transformed training feature set to obtain a first transformed decomposed training feature set and a second transformed decomposed training feature set;

obtaining a first similarity loss according to the decomposed first training feature set and the first transformed decomposed training feature set; and obtaining a second similarity loss according to the decomposed second training feature set and the second transformed decomposed training feature set.

17. An electronic device comprising:
at least one processor; and
at least one memory that is coupled to the at least one processor and stores instructions for execution by the at least one processor, wherein the instructions, when executed by the at least one processor, cause the electronic device to perform actions for generating an avatar, comprising:
generating an indication of correlation among image information, audio information, and text information of a video, the indication of the correlation comprising a tensor characterizing feature element associations between corresponding feature elements of the image information, the audio information, and the text information;
generating, based on the indication of the correlation and at least in part through application of a decomposition process to the tensor, a first feature set and a second feature set representing features of a target object in the video, wherein the first feature set represents invariant features of the target object in the video, and the second feature set represents equivariant features of the target object in the video; and
generating the avatar based on the first feature set and the second feature set;
wherein generating, based on the indication of the correlation, a first feature set and a second feature set representing features of a target object in the video comprises:
decomposing the tensor to obtain a decomposed image feature set, a decomposed audio feature set, and a decomposed text feature set; and
integrating the decomposed image feature set, the decomposed audio feature set, and the decomposed text feature set to generate an integrated feature set; and
wherein generating, based on the indication, a first feature set and a second feature set representing features of a target object in the video further comprises:
decomposing the integrated feature set into the first feature set and the second feature set.

18. The electronic device of claim 17, wherein the instructions, when executed by the at least one processor, further cause the electronic device to perform actions for training an avatar generation model, comprising:
receiving a sample image, a sample audio, and a sample text, wherein the sample image comprises a target object;
generating an indication of correlation among the sample image, the sample audio, and the sample text;
generating, based on the indication of the correlation, a first training feature set and a second training feature set for representing features of the target object; and
training the avatar generation model based on the first training feature set and the second training feature set.

19. A computer program product tangibly stored on a non-volatile computer-readable medium and including machine-executable instructions, wherein the machine-executable instructions, when executed, cause a machine to perform actions for generating an avatar, comprising:
generating an indication of correlation among image information, audio information, and text information of a video, the indication of the correlation comprising a tensor characterizing feature element associations between corresponding feature elements of the image information, the audio information, and the text information;
generating, based on the indication of the correlation and at least in part through application of a decomposition process to the tensor, a first feature set and a second feature set representing features of a target object in the video, wherein the first feature set represents invariant features of the target object in the video, and the second feature set represents equivariant features of the target object in the video; and
generating the avatar based on the first feature set and the second feature set;
wherein generating, based on the indication of the correlation, a first feature set and a second feature set representing features of a target object in the video comprises:
decomposing the tensor to obtain a decomposed image feature set, a decomposed audio feature set, and a decomposed text feature set; and
integrating the decomposed image feature set, the decomposed audio feature set, and the decomposed text feature set to generate an integrated feature set; and
wherein generating, based on the indication, a first feature set and a second feature set representing features of a target object in the video further comprises:
decomposing the integrated feature set into the first feature set and the second feature set.

* * * * *